April 21, 1925.                      1,534,413
J. RENSON
APPARATUS FOR BOILING AND WASHING LINEN
Filed Aug. 5, 1924
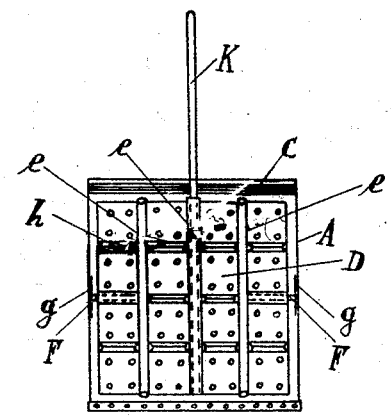
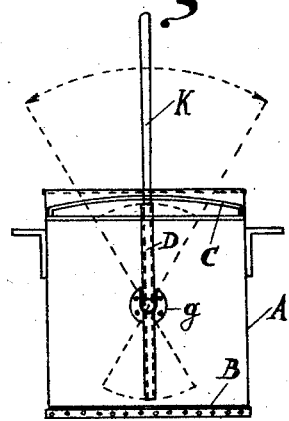
Inventor.
Jean Renson
per: Attorney.

Patented Apr. 21, 1925.

1,534,413

UNITED STATES PATENT OFFICE.

JEAN RENSON, OF BRUSSELS, BELGIUM.

APPARATUS FOR BOILING AND WASHING LINEN.

Application filed August 5, 1924. Serial No. 730,239.

*To all whom it may concern:*

Be it known that I, JEAN RENSON, a subject of the King of the Belgians, residing at 43 Rue Van Schoor, Brussels, Belgium, manufacturer, have invented a new and useful Apparatus for Boiling and Washing Linen, of which the following is a specification.

The present invention relates to an improved apparatus for boiling and washing linen.

In order that the said invention may be readily understood, an embodiment thereof is, by way of example only, illustrated by the accompanying diagrammatic drawings, wherein:

Fig. 1 is a vertical section through the boiling and washing apparatus according to the invention, and Fig. 2 is a vertical section through the same apparatus but taken at right angles to the section illustrated by Fig. 1.

Referring to the said drawing, the apparatus comprises a metal vessel A, preferably of square shape.

This vessel A is provided with a removable lid C. In the said vessel is arranged an oscillatory sprayer D, which consists of two sheets of copper riveted together and which have stamped therein reinforcing ribs $h$ and parallel grooves of semicircular cross section, so that by riveting the two sheets together the said grooves will form a series of vertical tubular passages $e$. The plane surfaces of the sprayer D, i. e. the spaces comprised between the parallel tubular passages $e$ on the one hand and between the reinforcing ribs $h$ on the other hand, are provided with holes or perforations. This sprayer D is provided with two central lateral trunnions $f$, by means of which the said sprayer is suspended within the vessel A, the said trunnions $f$ being supported in horse-shoe bearings $g$ so that the sprayer may be readily removed when required.

The vessel A is provided with a false bottom B, which has perforations formed therein both at the periphery and under the lower edge of the sprayer D.

By introducing into one of the vertical passages $e$ a broom stick or the like $k$ which projects through a suitable slot cut in the lid $c$ and thus forms an operating handle, the sprayer may be readily oscillated in the bearings $g$.

The said sprayer B thus divides the vessel A into two compartments of equal capacity, in which the linen to be washed is placed. This sprayer enables the suds, as soon as it is boiling to be distributed via the vertical passages $e$ over the linen so that in view of the continuous current of the suds through the linen the latter will be well prepared for the washing.

By causing the sprayer D to oscillate by means of the operating handle $k$, the linen contained in one of the compartments will be compressed at the bottom, while the linen contained in the other compartment will be compressed at the top. The operation of the sprayer is rendered very easy in view of the fact that the trunnions $f$ are placed centrally, so that any pressure on the linen on one side of the sprayer is counterbalanced and neutralized by an equivalent pressure exerted by the linen on the other side of the said sprayer.

By operating the sprayer D about a quarter of an hour, the linen, having been previously well boiled, will be washed in a perfect manner owing to the pressure of the sprayer thereon, which causes the boiling suds to be compelled to pass through the linen and thus to remove all the dirt.

In order to remove the linen from the apparatus, it is sufficient to remove the sprayer D first by lifting the trunnions $f$ out of the horse-shoe bearings $g$. The apparatus may be placed on any kitchen range, or may be provided with a gas or coal heated furnace.

I claim:

Improved apparatus for boiling and washing linen, comprising in combination: a vessel with removable slotted lid; a normally vertical oscillatory sprayer arranged within said vessel and having two central lateral trunnions removably supported in bearings fitted inside the vessel, the said sprayer consisting of two riveted metal sheets provided with reinforcing ribs and with parallel grooves forming a series of vertical tubular passages by juxtaposition of said sheets, the latter having their plane surfaces perforated; an operating handle inserted centrally in one of the vertical tubular passages and projecting through the slot in the lid of the vessel; and a false bottom fitted in said vessel and having perforations formed therein at the periphery and under the sprayer, substantially as described.

In testimony whereof I signed hereunto my name in the presence of two subscribing witnesses.

JEAN RENSON.

Witnesses:
G. Y. ZOLLAND,
EMIL VAN WARSETH.